Feb. 6, 1923.
S. C. NAGLE
AMUSEMENT DEVICE
Filed June 3, 1921
1,444,636
4 sheets-sheet 1
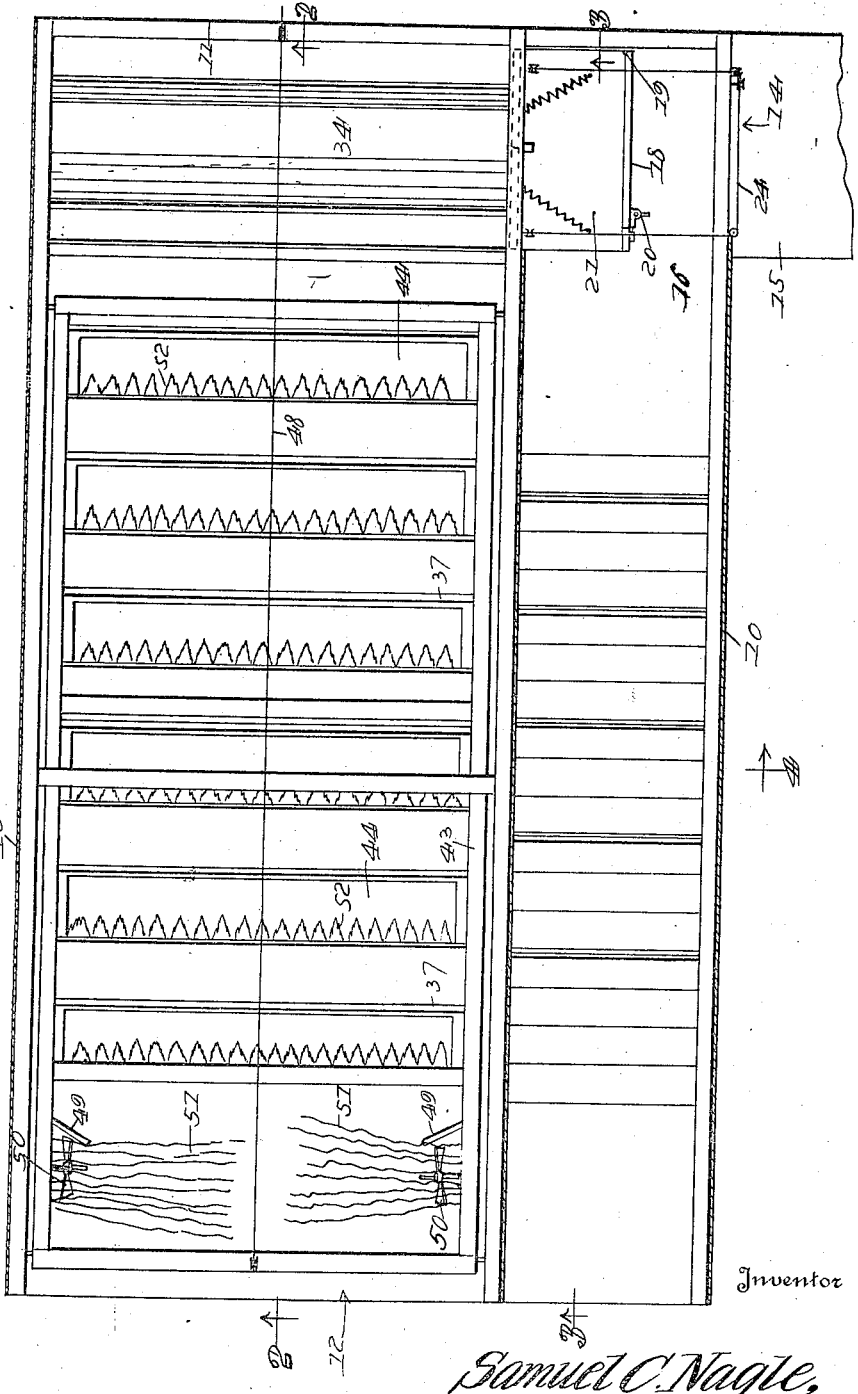
Inventor
Samuel C. Nagle,
By
Attorney

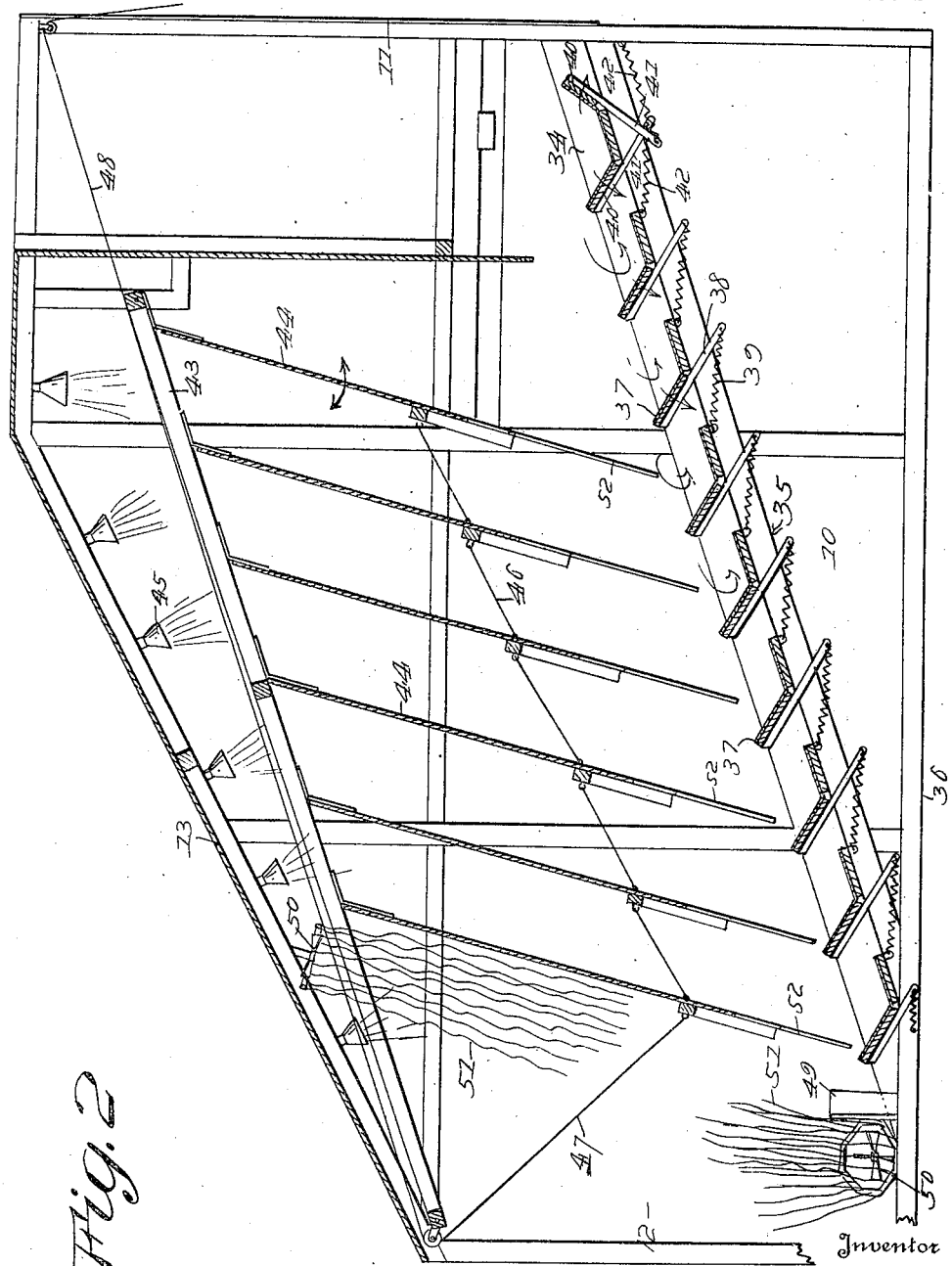

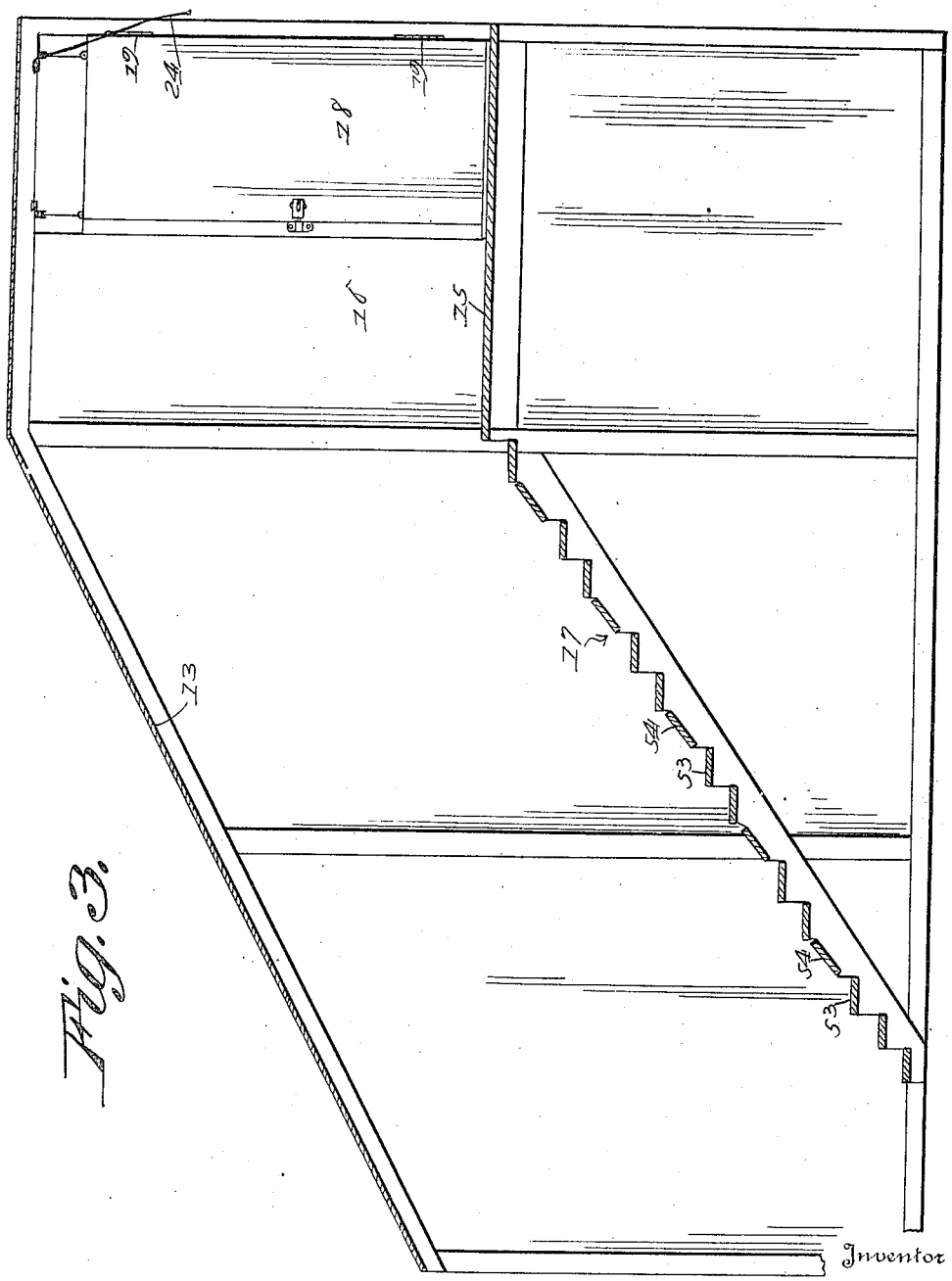

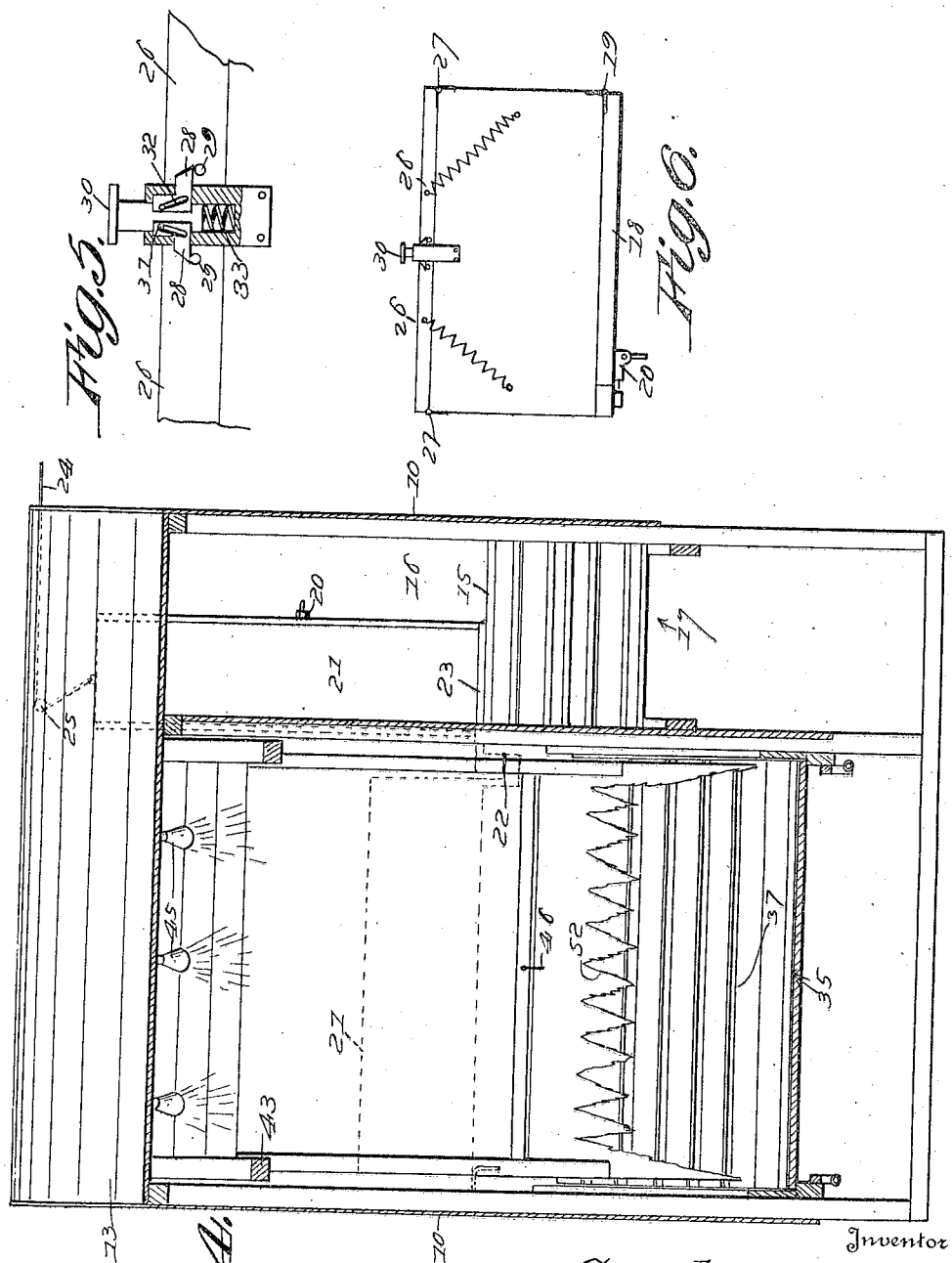

Patented Feb. 6, 1923.

1,444,636

UNITED STATES PATENT OFFICE.

SAMUEL C. NAGLE, OF LONDON, ENGLAND.

AMUSEMENT DEVICE.

Application filed June 3, 1921. Serial No. 474,834.

*To all whom it may concern:*

Be it known that SAMUEL CLARK NAGLE, a citizen of the United States of America, residing at London, England, has invented new and useful Improvements in Amusement Devices, of which the following is a specification.

The object of the invention is to provide an amusement apparatus of the general type designed to produce unusual and unexpected sensations to the participant or victim under conditions of which no warning or indication is given by the outside appearance of the device and which while conveying the impression of impending danger, after the trip through the apparatus has been started, serves to conduct the participant or victim to the outlet without involving the risk of any injury, so that the sensation at the conclusion or termination of the trip is one of relief accompanied by a tendency or inclination either to repeat the experience or to induce others to participate; and with these objects in view the invention consists in a construction and combination of parts of which a preferred embodiment is shown in the accompanying drawings, wherein:

Figure 1 is a plan view with the top or cover omitted of an apparatus embodying the invention.

Figure 2 is a vertical longitudinal sectional view on the plane indicated by the line 2—2 of Figure 1.

Figure 3 is a similar sectional view on the plane indicated by the line 3—3 of Figure 1.

Figure 4 is a transverse section on the plane indicated by the line 4—4 of Figure 1.

Figure 5 is a detail view of the latch mechanism carried by the trap.

Figure 6 is a top plan view of the trap.

The device consists essentially of an enclosure having side and end walls 10 and 11 with an outlet 12 at one end and a suitable cover 13 for use in protecting the interior when the apparatus is used in an out-of-doors location, an entrance opening 14 being arranged to lead from an elevated platform 15 into a passage 16 from which laterally leads a flight of steps 17 forming one of two selective means of progressing through the apparatus, the other selective means being concealed by a door 18 hinged as at 19 and having a suitable latch 20 which may be operated by the participant or victim and opening into a trap 21 having the appearance of a closet or cupboard but which is hingedly mounted at 22 for pivotal swinging movement from the normal vertical position shown in full lines in Figures 1 and 4 to the horizontal position indicated in dotted lines in Figure 4, said trap including a bottom or floor 23 which tilts with the walls of the trap and the door 18 which latter locks or latches behind the participant entering the trap and can not be opened from the inside.

While the trap may be mounted as indicated in a stable position adapting it to retain its upright position until after the participant has entered the same and the door has closed, it is subject to tilting movement by an operating means such as a cord 24 actuable from the exterior of the cabinet by the attendant or exhibitor, said cord passing over a direction pulley 25 and being attached to the trap in such a position that upon straining the cord the trap is tilted inward and may then be permitted to drop by its own weight together with that of the occupant to the horizontal position indicated as above stated in Figure 4.

The trap has an inner wall consisting of the wings or flaps 26 meeting at their inner edges as indicated in Figures 5 and 6 and hinged at their outer edges as shown at 27 and normally held in a closed position by latch mechanism consisting of the bolts 28 engaging pins 29 and actuable by a plunger 30 having pins 31 operating in inclined or cammed slots 32 in the bolts, said plunger being yieldingly held in its extended position with the bolts extended and in locking relation with the flaps 26 by means of a spring 33.

Arranged in the path of the head of the plunger is a stop 34 so that when the trap reaches its horizontal or approximately horizontal position the plunger is forced inward to actuate the latch bolts and release the flaps 26 so that the occupant thereof is discharged from the trap and deposited in a cradle 34 arranged at the top of an inclined plane 35 leading to the floor level at 36, said inclined plane or chute being provided at intervals with yielding obstacles 37 in the form of trap doors having arms 38 connected with tension springs 39. The cradle 34 is similarly provided with side walls 40 having arms 41 connected with springs 42 so that when the victim is deposited in the cradle the weight flattens the walls 40 and, the bottom of the cradle being at an inclination corresponding with the inclined plane or chute the occupant is caused to slide or roll down the inclination, successively encountering the several traps which yield to the weight imposed upon them until he is deposited at the bottom of the apparatus adjacent to the outlet opening 12.

Also suspended from the overhead framing 43 of the cabinet are swinging screens 44 which may be variously painted, illuminated or illustrated to represent evil spirits and scenes in the popular conception of hades or otherwise to have a more or less startling effect upon the victim, said screens being for example of light penetrable material exposed to the illuminating effect of lighting units 45 arranged in an overhead position and shining upon the screens. The lower edges of the screens preferably are located close to the plane of the chute so as to be encountered in common with the obstacles or barriers 37 by the victim in traversing the chute, but preferably the screens are connected flexibly as by cords 46 in a series, with the terminal screen connected to an operating cord 47 leading as at 48 to the exterior of the cabinet for manipulation, to impart a swinging movement to the screens by an attendant. The operating cord also permits of raising or lowering the screens at their lower edges, and at the outlet end of the cabinet, concealed from the victim by means of suitable screens 49 are blower units such as fans 50, arranged for example at the top and bottom of the cabinet or in any suitable relations with ribbons 51 arranged in the blasts and exposed to the colored lights furnished by the lighting units, to give the general appearance of flames or fire. The lower edges of the screens may also be serrated as indicated at 52 to carry out the impression of fire at the lower end of the chute by affording glimpses of the colored ribbons exposed to the action of the blower units.

The alternative or selective means of egress from the cabinet after entering the passage 16, and consisting of the flight of steps 17 preferably consists of steps which are irregularly arranged respectively in horizontal and inclined positions as indicated respectively at 53 and 54 to cause the pedestrian to stumble or slip in passing thereover and hence to make an awkward and noisy exit with the possibility of dropping to a seated or even a reclining position, but by reason of the fact that the steps are of relatively small area, such accident ordinarily is attended with no serious result or injury to the victim, even should the descent of the same be accomplished by sliding successively from step to step. The alternative or selective means of egress is provided as a means of affording surprise and to a certain extent disappointment to the victim who, having entered the passage 16, through timidity declines to enter by way of the door 18, and who having progressed as far as the passage 16 changes his mind and endeavors to beat a hasty retreat, in that such retreat resolves itself into a rout with consequent amusement to the by-standers.

Having described the invention, what is claimed as new and useful is:

1. An amusement apparatus having a cabinet enclosed chute accessible through a chute concealing entrance having a trap movable from an upright to a substantially horizontal position to correspondingly dispose the occupant and provided with means for discharging the occupant upon the chute, the entrance to the trap being controlled by a door having a latch operable only from the exterior.

2. An amusement apparatus having a cabinet enclosed chute accessible through a chute concealing entrance having a trap movable from an upright to a substantially horizontal position to correspondingly dispose the occupant and provided with means for discharging the occupant upon the chute, said trap being of dimensions only sufficient to receive an occupant in an upright position and having a bottom or floor and an automatically latchable entrance door movable with the trap.

3. An amusement apparatus having a cabinet enclosed chute accessible through a chute concealing entrance having a trap movable from an upright to a substantially horizontal position to correspondingly dispose the occupant and provided with means for discharging the occupant upon the chute, said trap being normally in a stable position and being tiltable by operating means accessible from the interior of the cabinet.

4. An amusement apparatus having a cabinet enclosed chute accessible through a chute concealing entrance having a trap movable from an upright to a substantially horizontal position to correspondingly dispose the occupant and provided with means for discharging the occupant upon the chute, said trap having its inner wall consisting of flaps, latch mechanism for holding the flaps in their closed position and means for disengaging the latch mechanism when the trap reaches its reclining position.

5. An amusement apparatus having a cabinet enclosed chute accessible through a chute concealing entrance having a trap movable from an upright to a substantially horizontal position to correspondingly dispose the occupant and provided with means for discharging the occupant upon the chute, said trap having its inner wall consisting of spring closed flaps, latch mechanism for locking the flaps in their closed position and actuable by a spring plunger, and a stop arranged in the path of said plunger when the trap reaches its reclining position.

6. An amusement apparatus having a cabinet enclosed chute accessible through a chute concealing entrance having a trap movable from an upright to a substantially horizontal position to correspondingly dispose the occupant and provided with means for discharging the occupant upon the chute, the chute being provided at its upper end with a cradle for receiving the occupant of the trap.

7. An amusement apparatus having a cabinet enclosed chute accessible through a chute concealing entrance having a trap movable from an upright to a substantially horizontal position to correspondingly dispose the occupant and provided with means for discharging the occupant upon the chute, the chute being provided at its upper end with a cradle for receiving the occupant of the trap and provided with depressible yielding side walls.

8. An amusement apparatus having a cabinet enclosed chute accessible through a chute concealing entrance having a trap movable from an upright to a substantially horizontal position to correspondingly dispose the occupant and provided with means for discharging the occupant upon the chute, said chute being provided with spaced obstacles.

9. An amusement apparatus having a cabinet enclosed chute accessible through a chute concealing entrance having a trap movable from an upright to a substantially horizontal position to correspondingly dispose the occupant and provided with means for discharging the occupant upon the chute, said chute being provided with spaced yielding obstacles.

10. An amusement apparatus having a cabinet enclosed chute accessible through a chute concealing entrance having a trap movable from an upright to a substantially horizontal position to correspondingly dispose the occupant and provided with means for discharging the occupant upon the chute, said chute being provided with spaced yielding obstacles consisting of spring held trap doors.

11. An amusement apparatus having a cabinet enclosed chute accessible through a chute concealing entrance having a trap movable from an upright to a substantially horizontal position to correspondingly dispose the occupant and provided with means for discharging the occupant upon the chute, swinging means being suspended above the chute.

12. An amusement apparatus having a cabinet enclosed chute accessible through a chute concealing entrance having a trap movable from an upright to a substantially horizontal position to correspondingly dispose the occupant and provided with means for discharging the occupant upon the chute, swinging means being suspended above the chute with their lower edges in obstructing relation with a body traversing the chute.

13. An amusement apparatus having a cabinet enclosed chute accessible through a chute concealing entrance having a trap movable from an upright to a substantially horizontal position to correspondingly dispose the occupant and provided with means for discharging the occupant upon the chute, screens being yieldingly suspended above the chute and lighting units being disposed to illuminate the same.

14. An amusement apparatus having a cabinet enclosed chute accessible through a chute concealing entrance having a trap movable from an upright to a substantially horizontal position to correspondingly dispose the occupant and provided with means for discharging the occupant upon the chute, screens being yieldingly suspended above the chute and lighting units being disposed to illuminate the same, said screens being of light penetrable material.

15. An amusement apparatus having a a cabinet enclosed chute accessible through a chute concealing entrance having a trap movable from an upright to a substantially horizontal position to correspondingly dispose the occupant and provided with means for discharging the occupant upon the chute, displaceable screens being suspended above the chute, lighting units arranged to illuminate the screens, blower units arranged adjacent to the chute and streamers disposed in the blast of the blower units and in obstructing relation with a body traversing the chute.

16. An amusement apparatus having a cabinet enclosed chute accessible through a chute concealing entrance having a trap movable from an upright to a substantially horizontal position to correspondingly dispose the occupant and provided with means for discharging the occupant upon the chute, and an alternative means of egress from the cabinet consisting of a flight of irregularly disposed steps.

In testimony whereof he affixes his signature.

SAMUEL C. NAGLE.